United States Patent [19]
Rosati

[11] Patent Number: 6,041,233
[45] Date of Patent: Mar. 21, 2000

[54] METHOD AND SYSTEM FOR PROVIDING GLOBAL VARIABLE DATA RATE CONNECTIVITY IN A SATELLITE-BASED COMMUNICATIONS NETWORK

[75] Inventor: Ronald F. Rosati, El Segundo, Calif.

[73] Assignee: Hughes Electronics Corporation, El Segundo, Calif.

[21] Appl. No.: 08/928,886

[22] Filed: Sep. 12, 1997

[51] Int. Cl.$^7$ .......................... H04B 7/185; H04B 7/204
[52] U.S. Cl. ..................... 455/427; 455/12.1; 455/428; 455/430; 370/316; 370/321; 370/326
[58] Field of Search .................. 455/12.1, 427, 455/428, 430; 370/316, 321, 326, 468, 252, 46

[56] References Cited

U.S. PATENT DOCUMENTS

| | | | |
|---|---|---|---|
| 4,858,225 | 8/1989 | deSantis . | |
| 5,274,627 | 12/1993 | De Santis | 370/49.5 |
| 5,404,375 | 4/1995 | Kroeger et al. | 375/200 |
| 5,424,862 | 6/1995 | Glynn | 359/172 |
| 5,448,621 | 9/1995 | Knudsen | 455/427 |
| 5,604,733 | 2/1997 | Hargrave | 370/337 |
| 5,745,480 | 4/1998 | Behtash et al. | 370/252 |
| 5,805,573 | 9/1998 | Umeda | 370/321 |
| 5,924,014 | 7/1999 | Vanden Heuvel et al. | 455/13.1 |

FOREIGN PATENT DOCUMENTS

| | | |
|---|---|---|
| 0748065A2 | 12/1996 | European Pat. Off. . |
| 3-14328 | 1/1991 | Japan . |
| 8-335900 | 12/1996 | Japan . |

*Primary Examiner*—Daniel S. Hunter
*Assistant Examiner*—Alan Gantt
*Attorney, Agent, or Firm*—Georgann S. Grunebach; M. W. Sales

[57] ABSTRACT

A method and system for providing global variable data rate connectivity in a satellite-based communications network includes a plurality of communications satellites for transmitting and receiving signals in a plurality of coverage areas. User terminals transmit and receive signals to and from the satellites. A set of the user terminals located in one of the coverage areas and associated with one of the communications satellites has a variable bandwidth associated therewith. The variable bandwidth is determined based on the collective bandwidth requirements of each of the user terminals in the set. Each of the user terminals may request a change in their bandwidth requirement independent of the variable bandwidth associated with the collective set of the user terminals.

12 Claims, 5 Drawing Sheets

METHOD AND SYSTEM FOR PROVIDING GLOBAL VARIABLE DATA RATE CONNECTIVITY IN A SATELLITE-BASED COMMUNICATIONS NETWORK

TECHNICAL FIELD

This invention relates to methods and systems for providing global variable data rate connectivity in a satellite-based communications network.

BACKGROUND ART

Communication systems almost always have a goal of efficiently using the electromagnetic spectrum allocated to them. Several methods to achieve this goal have been developed, including Frequency Division Multiple Access (FDMA), Time Division Multiple Access (TDMA) and Code Division Multiple Access (CDMA). In FDMA systems, each earth station has an assigned bandwidth between specified frequencies. The total satellite capacity is usually divided into several transponders. This bandwidth can be further divided, and parts assigned to specific customers and their earth stations. If there are n carriers being sent through the transponder simultaneously, they must be on individual frequencies (f1,f2,f3, . . . ,fn) with non-overlapping bandwidths separated by guard bands. Thus, each assigner has exclusive use of its assigned bandwidth.

In TDMA systems there are periodically recurring time slots during which message information of a particular user is transmitted/received. The users are assigned to particular time slots controlled by a master controller synchronized by a master clock. Each discrete channel set can be assigned one time slot. Each coverage area can use the same frequency channel or channel set without interference because the users in each coverage area only receive or transmit information during their assigned time slot. Each time slot can contain one message packet (i.e., single message time slots) or can contain multiple message packets (i.e., multiple sub-time slots each containing a single message). Even further, methods have been developed for dynamically assigning time slots based on the spectral capacity of each of the coverage areas. Such a method is disclosed in U.S. Pat. No. 5,604,733 issued to Hargrave.

CDMA is a spread spectrum technique where specified members of a set of orthogonal or nearly orthogonal spread spectrum codes are allocated, each using the full channel bandwidth. Two common spread spectrum techniques are direct-sequence and frequency hopping. These communication techniques are well known in the art.

An emerging goal of communications systems is to provide flexibility in service to its users. Some satellite communications systems offer a variable data rate to its users. This option, however, is typically only available when a drop-out occurs in the primary data rate communications.

Thus, there exists a need for a satellite-based communications system that provides efficient use of the allocated electromagnetic spectrum while offering flexibility in services to its users, such as variable data rate and location based on the users' needs.

DISCLOSURE OF THE INVENTION

It is thus a general object of the present invention to provide a flexible satellite-based communications system that efficiently utilizes the allocated electromagnetic spectrum.

It is another object of the present invention to provide a satellite-based communications system enabling a user to vary the data rate and the location at which the communications are transmitted and received.

In carrying out the above objects and other objects, features, and advantages of the present invention, a method is provided for providing global variable data rate connectivity. The method includes the step of assigning a first variable bandwidth to a first set of a plurality of user terminals located in one of a plurality of coverage areas and associated with one of a plurality of communications satellite based on the collective bandwidth requirements of each of the first set of the plurality of user terminals.

In further carrying out the above objects and other objects, features, and advantages of the present invention, a system is also provided for carrying out the steps of the above described method. The system includes a plurality of communications satellites for transmitting and receiving a plurality of signals in a plurality of coverage areas. The system also includes a plurality of user terminals for transmitting and receiving signals to and from the plurality of satellites. A first set of the plurality of user terminals located in one of the plurality of coverage areas and associated with one of the plurality of communications satellites has a first variable bandwidth based on the collective bandwidth requirements of each of the first set of the plurality of user terminals.

The above objects and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
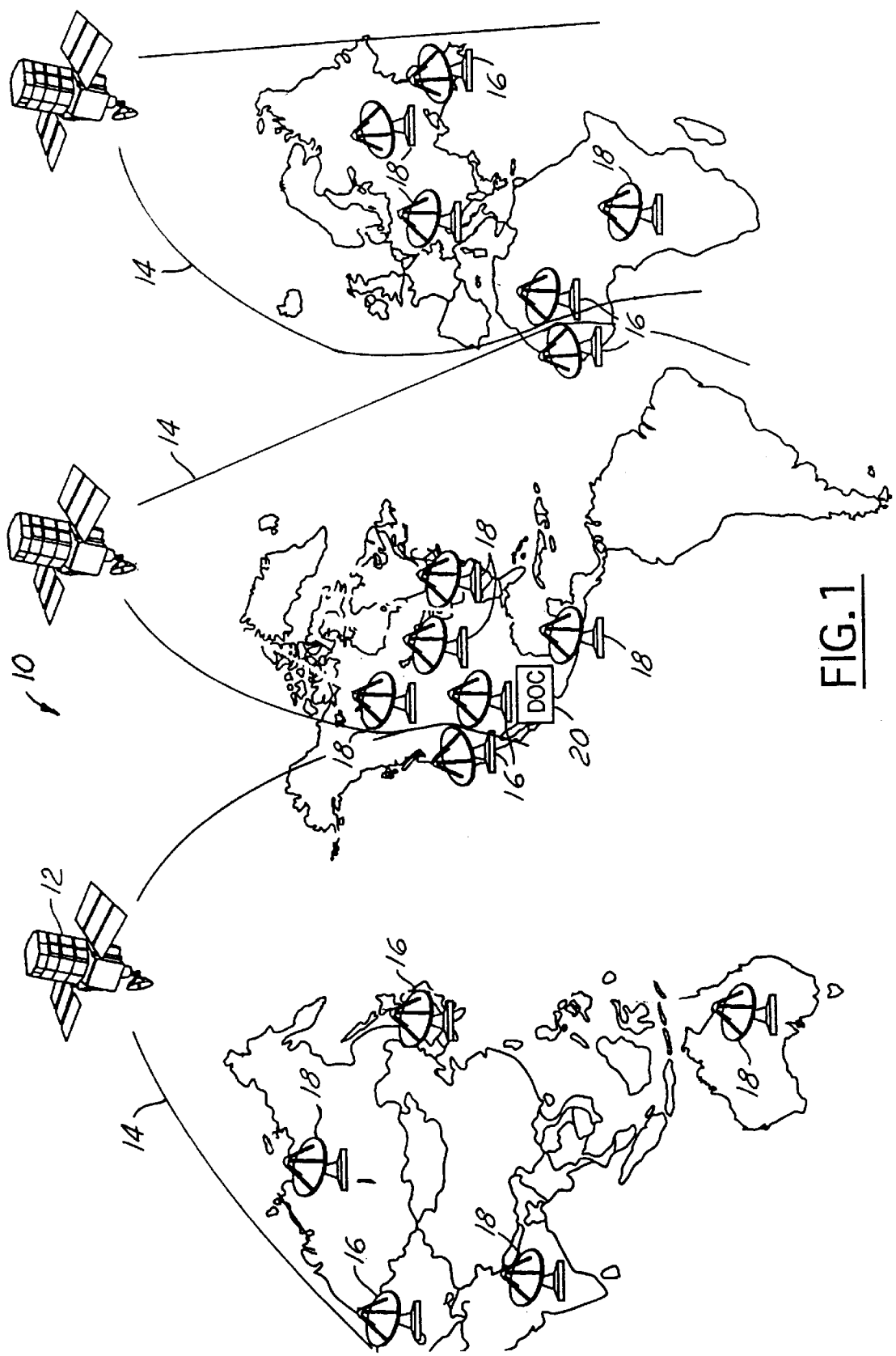
FIG. 1 is a diagrammatic representation illustrating a satellite communication system of the present invention.
Figure 2:
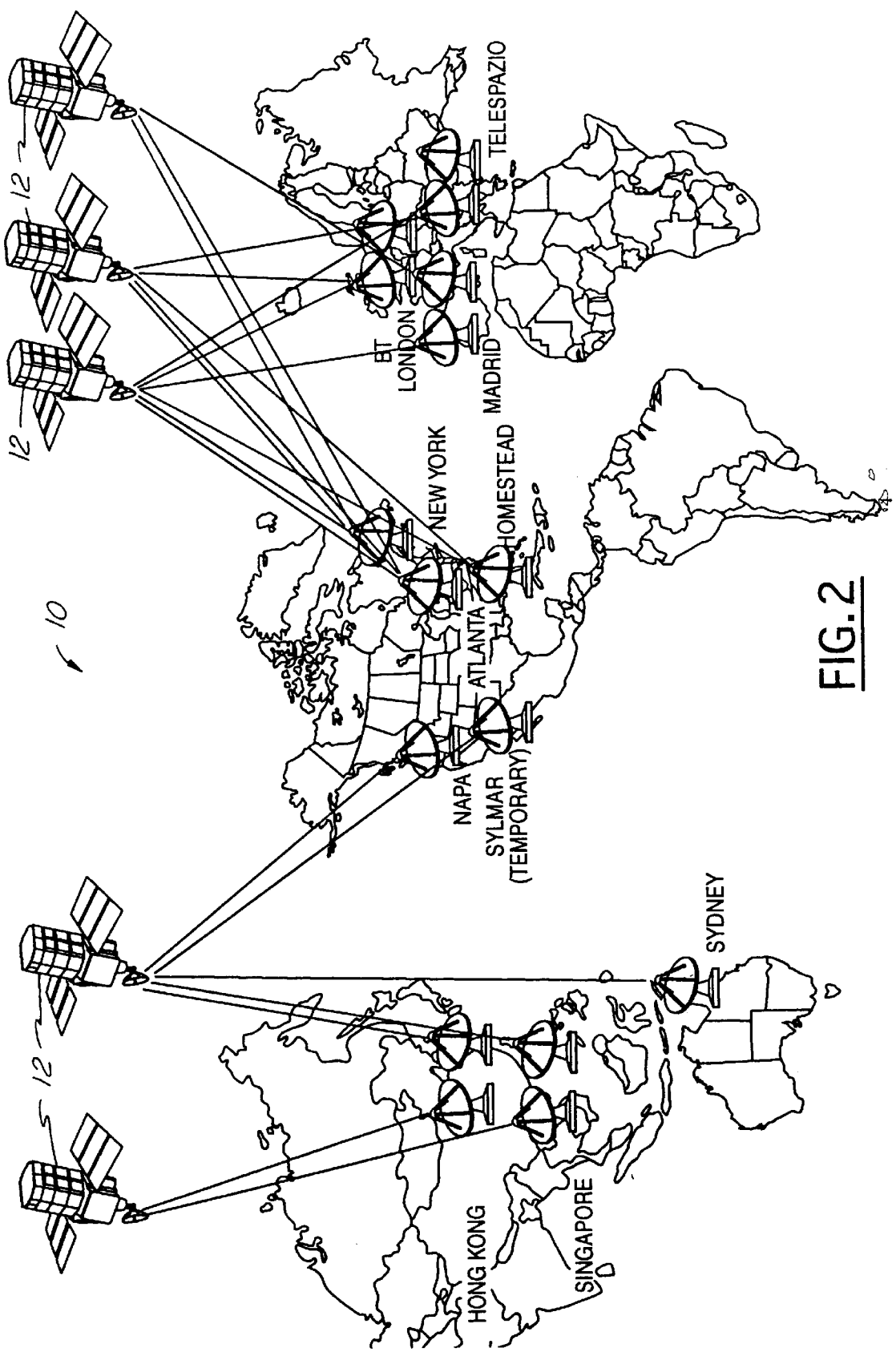
FIG. 2 is a diagrammatic representation illustrating the global communications coverage provided by the satellite communication system of the present invention.

Referring first to FIG. 1, a communications system 10 with a typical geometry for practicing the present invention is diagrammatically illustrated. In general, the system 10 includes a plurality of communicatiors satellites 12 for transmitting and receiving signals to and from a plurality of coverage areas 14. Although FIG. 1 depicts a three-satellite communications network, as can be seen in FIG. 2 the satellite network of the system 10 is made up of a constellation of a plurality of satellites covering the globe. The current preferred constellation is comprised of fifteen satellites. Similarly, the quantity and geographic location of the coverage areas 14 are not limited to those shown in FIG. 1, but may be defined and consist of as many areas as desired. The satellites 12 operate in both the C (4 GHz–8 GHz) and Ku (12 GHz–18 GHz) band portions of the electromagnetic spectrum.

System 10 further includes at least two gateway stations 16 located in each of the coverage areas 14. Each of the gateway stations 16 must reside at the edge of their respective coverage area 14 (farthest east and farthest west) to insure access to any adjacent satellite in the constellation for global access with no more than two hops to get from one satellite coverage area to another. Gateway stations 16 also provide an interface between the satellites 12 and terrestrial communications, such as a Public Switched Telephone Network (PSTN), the Internet, Asynchronous Transfer Mode (ATM) networks, Local Area Networks (LANs), etc.

System 10 also includes a plurality of user terminals 18 located throughout coverage areas 14 for transmitting and receiving signals to and from the satellites 12. A ground facility 20, such as a Demand-Net Operations Center (DOC), in communication with each of the user terminals 18 and each of the satellites 12, manages the system 10, distributes satellite bandwidth and adjusts user terminals 18, as will be more fully described below.

User terminals 18 are preferably Very Small Aperture Terminals (VSATs) that have full duplex capability and operate in both C and Ku band. User terminals 18 vary in dish size and transceiver power depending on the location, data rate, application and intended use, such as terminal to terminal, terminal to hub, etc. Each user terminal 18 has the ability to be used anywhere within the entire global coverage area of the satellite constellation for a given data rate. User terminals 18 also preferably support a variety of network services such as LAN environments, Integrated Services Digital Network (ISDN), Ethernet, TC/PIP and Private Branch Exchange/Internet access. Voice, data, video, imaging, and electronic mail are also supported.

Figure 3:
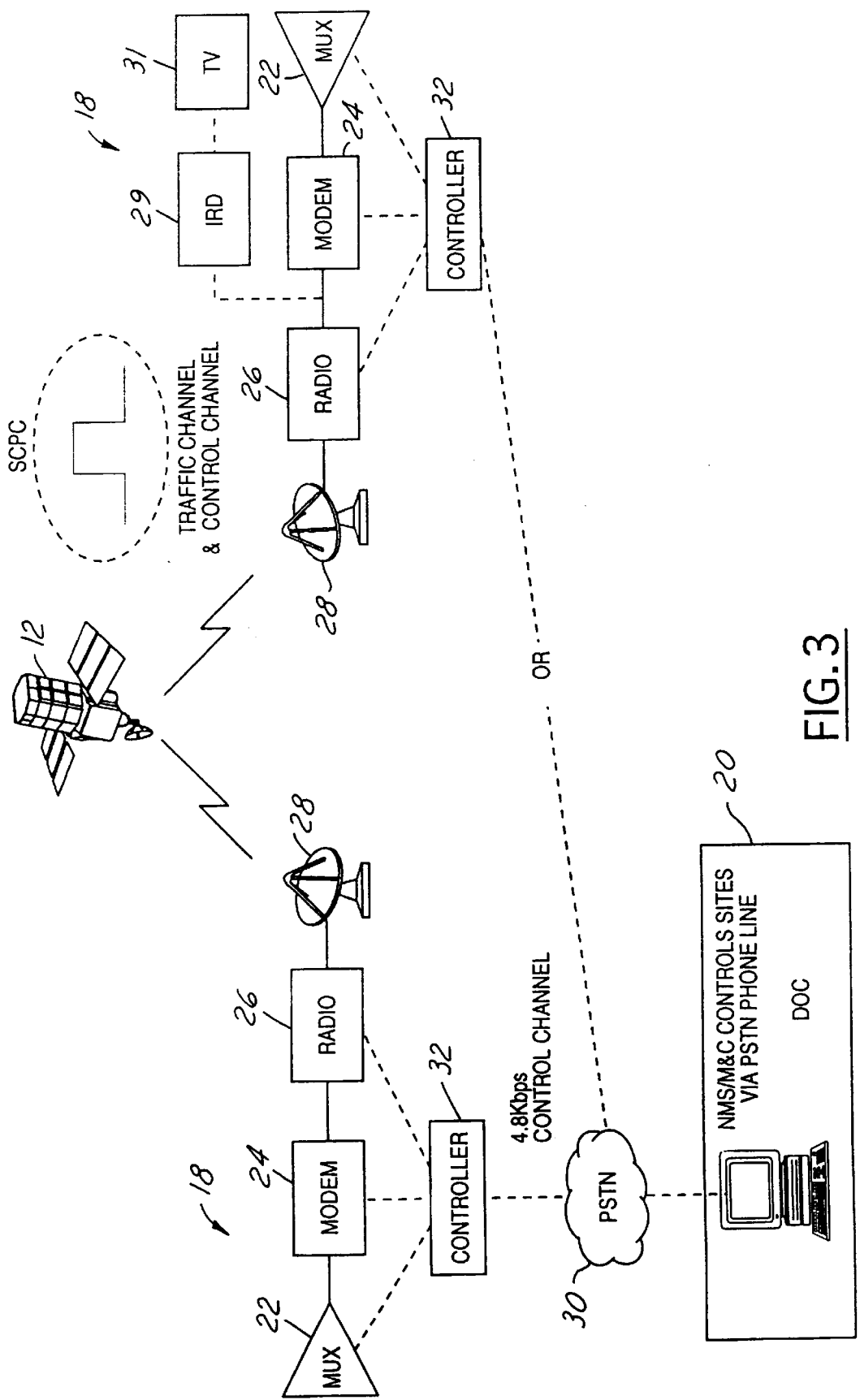
FIG. 3 is a block diagram of a user terminal employing in-band control signaling.

Each of user terminals 18 basically consist of a multiplexer 22, modem 24, RF transceiver 26 and an antenna 28, as shown in FIG. 3. In transmitting signals from user terminal 18, multiplexer 22 receives multiple inputs, such as phones, video, fax, etc., and combines them together to obtain a single aggregate output. This output is passed to modem 24 for signal modulation and then to RF transceiver 26 which transmits the signal through antenna 28 to a preselected satellite 12. Opposite operations are performed when receiving signals from satellite 12. Antenna 28 can be mounted in one of two ways: non-penetrating load frame mount or by a penetrating mount. A non-penetrating mount is mounted onto a large frame, while a penetrating mount is cemented into the ground using a pole. Alternatively, user terminal 18 may have an additional Integrated Receiver Decoder (IRD) 29 for receiving entertainment data at a television (TV) 31 broadcast by different satellites 12 in various parts of the world.

The configurations of the user terminals 18 are for full duplex point-to-point communications with varying methods of transmission. The user terminals 18 are remotely controllable in channel speed, data rate, carrier power, carrier frequency and terminal activation. There are two configurations for these remotely controlled user terminals 18: inband control and outband control.

An inband control terminal is shown in FIG. 3. An inband control terminal is a Single Channel Per Carrier (SCPC) earth station configuration requiring inband monitoring and control (M&C). This is accomplished by an overhead control channel which is not associated with the traffic channel occupying the remainder of the data rate. The M&C data rates do not exceed 4.8 Kbps in overhead bandwidth. The multiplexer 22, modem 24 and RF transceiver 26 are controlled by the DOC 20 via a Public Switched Telephone Network (PSTN) 30 to the terminal controller 32. Either one of the terminals is designated as a Master terminal, while the other terminal acts as a Slave terminal. The Master terminal is controlled by the DOC 20 via the phone line, while the slave terminal is controlled by the Master terminal via satellite communications.

Figure 4:
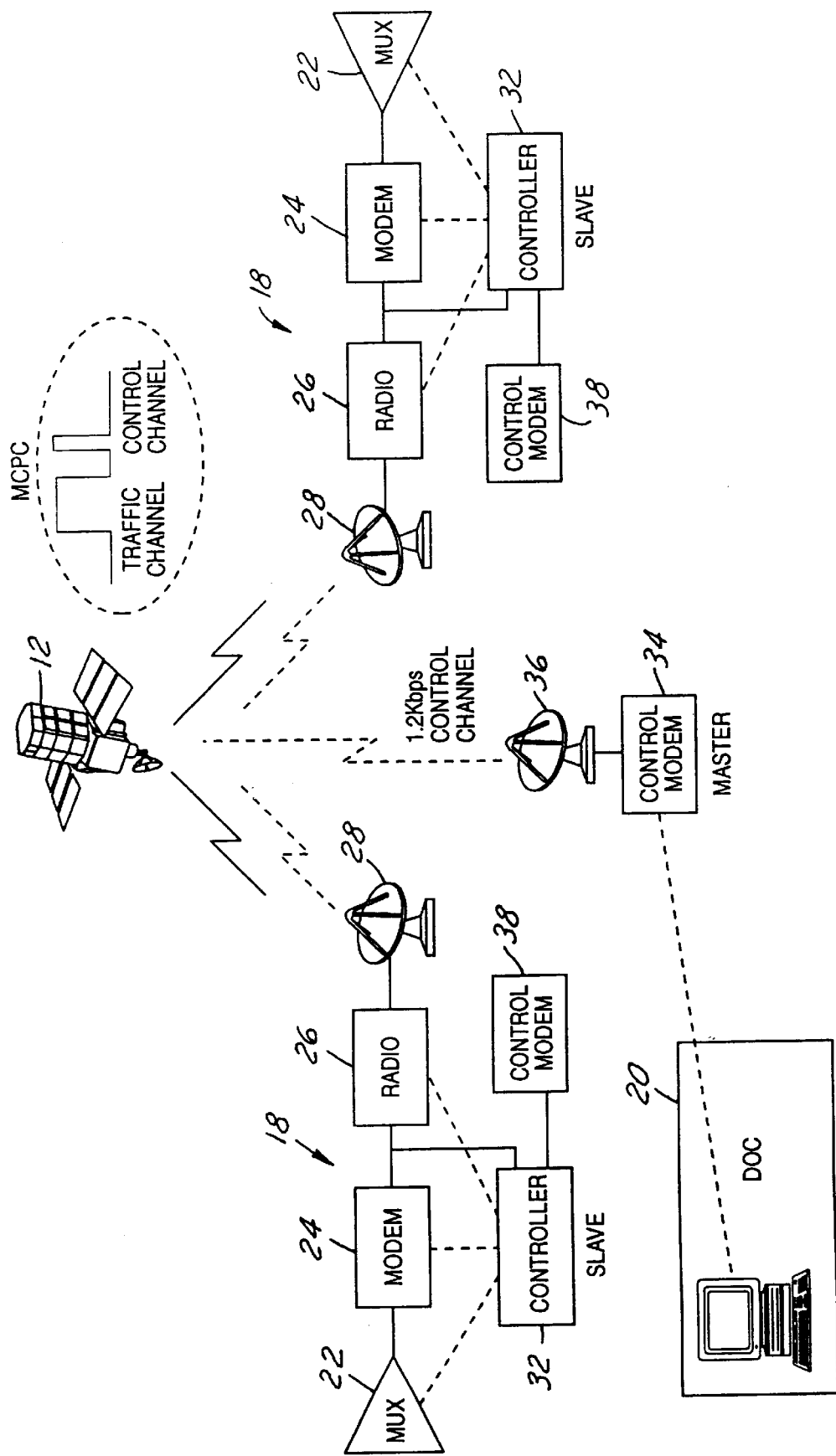
FIG. 4 is a block diagram of a user terminal employing out-band control signaling.

Turning now to FIG. 4, there is shown a block diagram of an outband control terminal. The outboard control terminal is a Multiple Channel Per Carrier (MCPC) earth station configuration requiring out-of-band M&C. This is accomplished by use of a secondary control modem 34 at a satellite uplink station 36. The DOC 20 controls secondary control modem 34 via a phone line to the satellite uplink station 36. The associated M&C data is transmitted by satellite uplink station 36 to slave control modems 38 located at each terminal 18 for controlling each of the terminals 18 through a separate satellite carrier for monitor and control only.

Each of the user terminals 18 belong to at least one network. A network may consist of a plurality of user terminals 18 in a plurality of coverage areas 14 dispersed throughout the world, or may only have a plurality of user terminals 18 located in one coverage area 14. Data rates available for communications are from 64 Kbps to as high as the network in question requires in predetermined increments, such as 64 Kbps. The data rate is related to frequency as follows:

Data Rate (Mbps)=Frequency(MHz)/DRF, where DRF is a data rate factor corresponding to characteristics of the satellite transponder (not shown).

The customer's network consists of prepurchased satellite capacity or bandwidth from the fixed bandwidth capacity of the satellite 12. This bandwidth can be shared globally. That is, the network can distribute the prepurchased bandwidth in any manner, such as a portion of the bandwidth for use in Los Angeles, another portion for use in London, and still another portion for use in Hong Kong.

The communications may be priced and managed in two) ways: flat rate (bulk) and on-demand (adhoc). The flat rate service is a contracted bulk service that operates the network under nominal operations. The bulk bandwidth is distributed any way the network user wishes globally, based on availability, and is guaranteed for use by the terminals 18 and for data rate changes within their service capacity. The network user may move their bulk capacity to another region outside of the existing satellite coverage area upon prior notice to the DOC 20. The on-demand service may be an additional charge applied as the network varies and fluctuates. At any time, the flat rate service can be adjusted to accommodate frequent "on-demand" requests which can be folded into the flat rate service.

The network user may dynamically apportion the prepurchased bandwidth within their network any way they desire. For example, a 2 Mbps segment can be distributed dynamically to 16 sites @ 128 Kbps, 8 sites @ 256 Kbps, 5 sites @ 384 Kbps and 1 site @ 128 Kbps. This can be performed as often as desired by the users upon prior notification to DOC 20. Upon approval by the DOC 20, the DOC 20 sends command strings to the affected terminals 18 to reconfigure the data rate of the affected terminals 18.

The users have the ability to request a bandwidth change at anytime, anywhere from their prepurchased bandwidth segment (flat rate) or on an as-needed basis (on-demand). The DOC 20 provides bandwidth adjustments in one of two ways. First, the additional bandwidth is taken from idle capacity, i.e., one region is not utilizing all the bandwidth assigned thereto (flat rate). Otherwise, the user may purchase additional bandwidth from the DOC 20 (on-demand). Users may purchase this additional bandwidth utilizing full duplex capabilities from 64 Kbps to the maximum allowable data rate for the given terminal in small increments such as 64 Kbps. Changes to the terminal data rates can be performed via scheduled changes or by informing the DOC 20 as needed.

Thus, the DOC 20 controls all aspects of the communications. Terminal channel speed, data rate, carrier power, carrier frequency and terminal activation commands are issued from the DOC 20. Remote monitoring of terminal integrity is also performed by the DOC 20. If the user needs technician support to move terminals, the DCC 20 takes all such requests. All maintenance, training, troubleshooting, help desk, new orders, augmenting orders, etc. are routed through the DOC 20. This provides the users with a single interface to accommodate their needs.

The DOC 20 also manages the data rate distribution of the networks. Requests for terminal location changes outside the existing capacity are handled by the DOC 20, which will then arrange adjustments to existing location communications. The DOC 20 also manages space communications, terrestrial communications and terminal charges.

Figure 5:
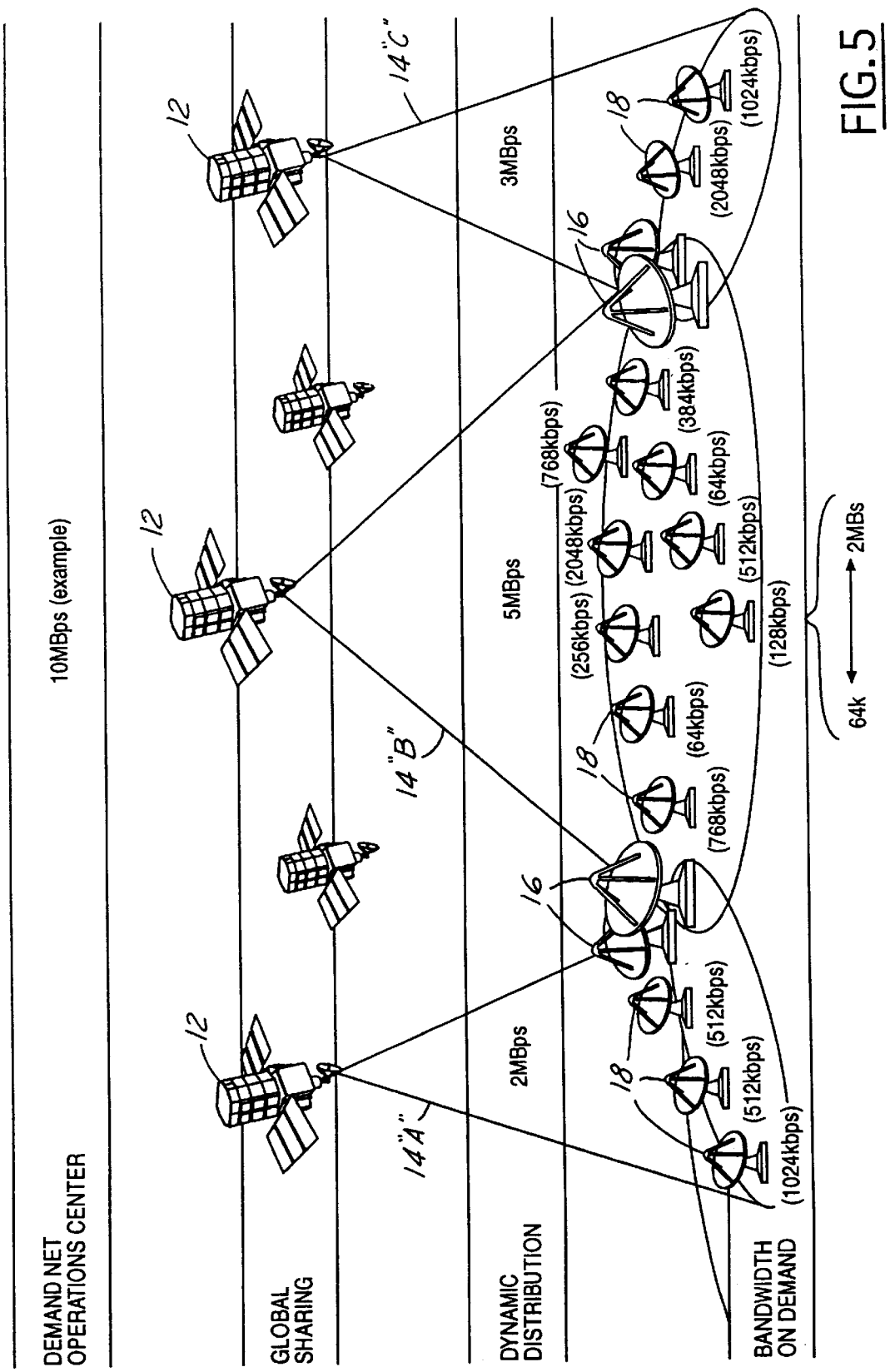
FIG. 5 is a concept drawing illustrating the features of the present invention.

The system 10 of the present invention gives the users the ability to vary the data rate capabilities of their network or individual terminals with full duplex capabilities. A concept drawing illustrating the features of the present invention is shown in FIG. 5. For illustrative purposes, the present invention is described in conjunction with three coverage areas associated with a network of user terminals 18. It should be understood, however, that the present invention is not limited to such an arrangement. As can be seen in FIG. 5, a network of user terminals 18 may comprise three coverage areas 14 or regions "A", "B" and "C". In this example, the user has purchased 10 Mbps of bandwidth from the system 10, and has chosen to distribute 2 Mbps to region "A", 5 Mbps to region "B", and the remaining 3 Mbps to region "C". Within each region, the network user has distributed each of the bandwidth segments to the user terminals 18 at various data rates as required by the user terminals 18.

The system 10 operates ideally in a bandwidth limited mode, i.e., the satellite operating characteristics are restricted by the bandwidth assigned. The transmission to and from the satellite function according to the limits of the bandwidth (or data rate). This is the nominal configuration which sizes the terminals for the appropriate data rates. However, there may be unique requirements that may place a connection in power limited operations and requires more satellite power to operate a terminal than under a normal bandwidth limited scenario. In this case, the transmission to and from the satellite function according to the limits of the power received and transmitted by the satellite. This means that the terminal sizes are constrained and require more of the satellite power than would be required under normal bandwidth limited operations to ensure quality communications.

Thus, the system of the present invention provides flexibility in three ways. First, global sharing is provided by enabling the user to distribute their bandwidth globally any way they wish, and is guaranteed for their use and for data rate changes within the region. Due to the system's global aggregate distribution, the user may move their capacity to another region outside of the existing satellite coverage.

Second, dynamic distribution is possible by allowing the user to dynamically apportion bandwidth within their network any way they desire. For example, a 2 Mbps segment can be distributed dynamically to 16 sites @ 128 Kbps, 8 sites @ 256 Kbps, 5 sites @ 384 Kbps and 1 site @ 128 Kbps. This can be performed as often as necessary. Communications costs are thus significantly reduced through the sharing of these segments.

Third, bandwidth on demand is also possible since the users have the ability to request a bandwidth changes at anytime, anywhere from their prepurchased bandwidth segment (flat rate service) or in increments outside their prepurchased bandwidth segment (on-demand service). Users may select full duplex capabilities from 64 Kbps to a maximum allowable data rate for the given terminal in small increments such as 64 Kbps. Changes to the terminal data rates can be performed via scheduled changes or informing the DOC either through satellite communications or the PSTN.

The system of the present invention is ideal for two-way high data rate applications such as training, telemedicine, interactive distance learning, teleconferencing, shared data networks, etc., and supports needs such as multiple site networks, global connectivity, surge capabilities, and flexible operations. The flexibility of the system of the present invention allows a virtually unlimited capability to increase the number of sites, relocate existing terminals, redistribute bandwidth, and adjust user data rates to anywhere in the world.

While the best modes for carrying out the invention have been described in detail, those familiar with the art to which this invention relates will recognize various alternative designs and embodiments for practicing the invention as defined by the following claims.

What is claimed is:

1. A system for providing global variable data rate connectivity in a satellite-based communications network comprising:

communications satellites for transmitting and receiving signals in a plurality of coverage areas; and user terminals for transmitting and receiving signals to and from the satellites;

wherein a first set of the user terminals located in one of the plurality of coverage areas and associated with one of the communications satellites has a variable bandwidth associated therewith based on the collective bandwidth requirements of each of the first set of user terminals;

wherein each of the first set of user terminals has a variable terminal bandwidth associated therewith which varies in response to a bandwidth request from each of the first set of user terminals;

the system further comprising a ground facility for controlling the variable bandwidth and the variable terminal bandwidth of the first set of user terminals in response to the bandwidth request;

wherein the first set of user terminals includes a plurality of pairs of user terminals and wherein each of the user terminals include a controller for receiving controlling signals and for transmitting monitoring signals, wherein the controller of a first one of each of the pairs receives the signals from the ground facility and the controller of a second one of each of the pairs receives the signals from the first one.

2. The system as recited in claim 1 wherein the collection of the variable terminal bandwidth corresponds to the variable bandwidth.

3. The system as recited in claim 1 further comprising a second set of user terminals located in a second one of the plurality of coverage areas and associated with a second one of the communications satellites wherein the first set of user terminals has a first portion of the variable bandwidth associated therewith based on the collective bandwidth requirements of each of the first set of user terminals and wherein the second set of user terminals has a second portion of the variable bandwidth associated therewith based on the collective bandwidth requirements of each of the second set of the user terminals.

4. The system as recited in claim 3 wherein a sum of the first and second portions equal the variable bandwidth.

5. The system as recited in claim 1 wherein the ground facility controls the first set of user terminals utilizing inband control.

6. The system as recited in claim 1 wherein the controller of the first one of each of the pairs is coupled to the ground facility via a Public Switched Telephone Network.

7. The system as recited in claim 1 wherein the ground facility controls the first set of user terminals utilizing outband control.

8. A system for providing global variable data rate connectivity in a satellite-based communications network comprising:

communications satellites for transmitting and receiving signals in a plurality of coverage areas;

user terminals for transmitting and receiving signals to and from the satellites;

a control modem coupled to the ground facility for receiving monitoring and controlling signals from the ground facility; and a satellite uplink station for transmitting the monitoring and controlling signals to each of the first set of user terminals;

wherein a first set of the user terminals located in one of the plurality of coverage areas and associated with one of the communications satellites has a variable bandwidth associated therewith based on the collective bandwidth requirements of each of the first set of user terminals;

wherein each of the first set of user terminals has a variable terminal bandwidth associated therewith which varies in response to a bandwidth request from each of the first set of user terminals;

the system further comprising a ground facility for controlling the variable bandwidth and the variable terminal bandwidth of the first set of user terminals in response to the bandwidth request.

9. The system as recited in claim 1 further comprising at least one terrestrial gateway station located in each of the plurality of coverage areas for providing communications between the user terminals and a terrestrial network.

10. The system as recited in claim 1 wherein the plurality of satellites transmit and receive signals at a first and second frequency range, the first frequency range being different from the second frequency range.

11. The system as recited in claim 8 wherein the ground facility controls the first set of user terminals utilizing inband control.

12. The system as recited in claim 8 wherein the ground facility controls the first set of user terminals utilizing outband control.

* * * * *